July 30, 1968  H. H. ROGERS ET AL  3,394,982

TORCH

Filed June 23, 1966

INVENTOR.
HOWARD H. ROGERS
DAVID F. SHEEHAN
BY
Stuart W. Wohlgemuth
ATTORNEY 3,394,982
TORCH
Howard H. Rogers, Woodland Hills, and David F. Sheehan, Canoga Park, Calif., assignors to North American Rockwell Corporation, a corporation of Delaware
Filed June 23, 1966, Ser. No. 559,955
5 Claims. (Cl. 431—6)

ABSTRACT OF THE DISCLOSURE

A cutting or welding torch suitable for deep submergence use that directs a hot exhaust flame against the part to be worked, said hot exhaust flame coming from a combustion chamber that has had liquid, slurried or gelled fuel and oxidizer injected into it.

---

This invention relates to a cutting and welding torch. More particularly, the invention relates to a cutting and welding torch for use in environments varying from underwater submergence to outer space.

Prior to the herein invention several types of cutting and welding torches were available. Most cutting torches use a source of gas which is ignited to cause the necessary hot flame for burning or welding. There have been torches disclosed which have utilized hypergolic oxidizer and fuel combinations which would be suitable in environments where ignition is not practicable. However, all of the previously disclosed torches created the flame outside of the torch environment; in other words, outside the tip of the torch. This was the case both in the utilization of single gas, multiple gases, or even through the use of hypergolic materials. There are several disadvantages in creating the initial flame or combustion outside the tip of a torch burning liquids. This is particularly highlighted in underwater deep submergence applications where the liquid stream is dispersed in the surrounding water so that the concentration of the flame is not sufficient to cut or weld metals.

In both underwater and space applications, the bulk and weight of the fuel and oxidizer are of prime importance. With gaseous fuel and oxidizer the tankage weight and size becomes critical so that the effective use of these materials is often not practical in underwater or space applications. In order to compress gases to the degree necessary for operation in these environments, the tanks required are so heavy and large as to make gas utilization impractical.

Thus, an object of this invention is to provide a cutting and welding torch which utilizes liquids, slurry, or gel fuels and oxidizers instead of highly compressed gases.

Another object of this invention is to provide a novel cutting and welding torch which utilizes as fuel and oxidizer materials which do not require heavy, large tanks for underwater or space applications.

Still another object of this invention is to provide a cutting and welding torch for utilization in underwater application wherein the water cannot substantially disperse the flame of the torch.

Still one further object of the invention is to provide a cutting and welding torch wherein the hot flame and gases are created within the body of the torch prior to exhaust therefrom.

The above and other objects of this invention are accomplished by a novel torch which has many of the characteristics and is similar to a rocket motor. The torch comprises an enclosed housing with inlet lines admitting the fuel and oxidizer thereto. The fuel and oxidizer are brought to an injector plate where they are sprayed into a combustion chamber formed within the housing. Within the combustion chamber the fuel and oxidizer are ignited, burn, and exhaust through a nozzle provided in the housing co-extensive with the combustion chamber formed therein. The nozzle serves to collimate the hot gases into a concentrated beam. Either or both of the oxidizer and fuel may be a liquid, slurry, or gel. Obviously, gas can be used, yet is not preferable for deep submergence. It is preferable that the fuel and oxidizer be hypergolic so as to eliminate the necessity of an external ignition source. However, an additional means can be provided to ignite non-hypergolic fuels and oxidizers. It is believed that the invention will be better understood from the following detailed drawings and description in which:

Figure 1:
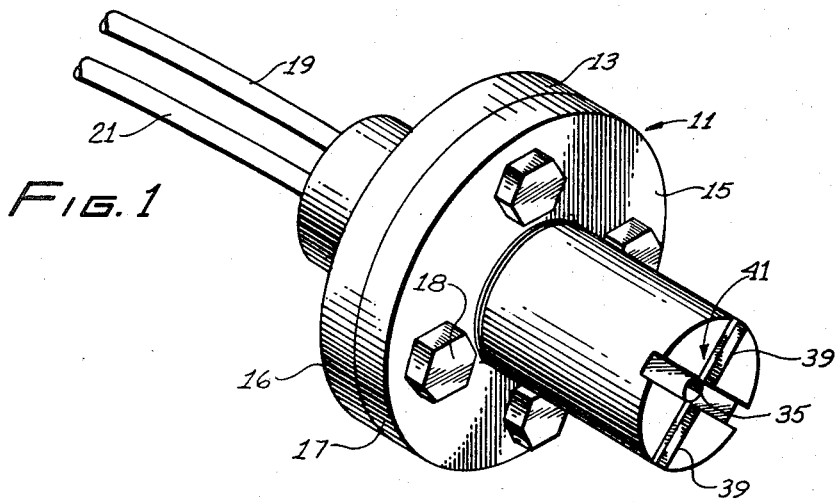
FIG. 1 is a pictorial representation of the torch of the invention.

Referring now to FIG. 1 there is shown the torch 11 of the invention comprised of a housing made up of two parts. The first part 13 contains an injector. The front part 15, as will be described, contains the combustion chamber, throat, and nozzle. As shown, the two parts may be suitably attached at flanges 16 and 17, respectively, by bolts 18. Feed lines 19 and 21, respectively, admit the fuel and oxidizer to the device.

Figure 2:
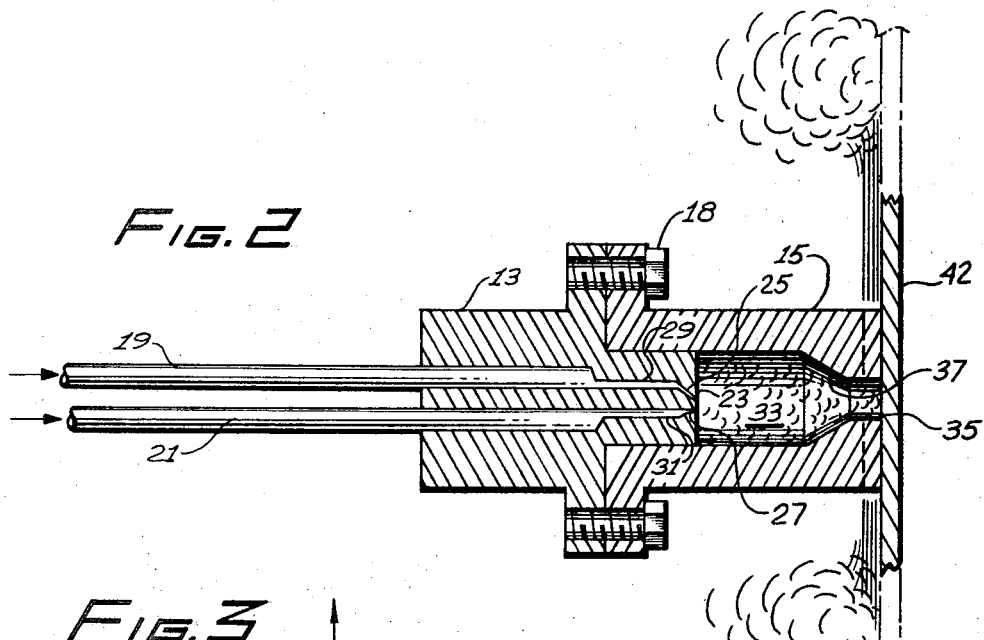
FIG. 2 is a sectional view of the torch of the invention.

Turning now to FIG. 2 wherein the details of the torch are shown, it can be seen that the feed lines 19 and 21 comprised of suitable tubing are tight-fitted within passages provided in the solid back portion 13 of the torch. The exposed face 23 of the portion 13 of the torch serves as the injector face for the device. As shown, small orifices 25 and 27 are drilled into the body 13 from the face 23. The orifices communicate with linking passages 29 and 31 connecting to the feed lines 19 and 21. The orifices 25 and 27 serve to bring the fuel and oxidizer together within a combustion chamber 33 formed within the housing 15.

As shown in the specific example of FIG. 2, line 21 which may, for example, be the oxidizer line will inject the oxidizer in a line parallel to the feed line 21 whereas the orifice 25 connecting to line 19 which, for example, may be the fuel line, will admit the fuel into the combustion chamber so as to impinge upon the stream of oxidizer from orifice 27. The hot gases formed in the combustion chamber area 33 will exit from the torch through a nozzle portion 35 of considerably lesser diameter and area than the chamber. The nozzle serves to collimate the gases into a concentrated stream. Connecting the nozzle 35 to the chamber is a throat area 37 which serves to constrict the gases formed in the chamber 33 prior to the exit through the nozzle portion. The throat 37 by being a constriction holds back a portion of the burning gases and thereby builds up pressure in the chamber 33. This pressure increase, in turn, serves to raise the temperature of the combustion products making them more suitable for cutting and welding purposes.

The outside face of the torch adjacent the nozzle 35 has four slots 39 therein. By this means, the face 41 of the torch may be moved directly against the surface of workpiece 42 to be cut while allowing the combustion products to escape through the slots 39. The number and configuration of the slots are obviously not critical but rather serve merely as a means for the gases to escape when direct contact is made between the face of the torch and a surface being cut. As can thus be seen, in underwater applications particularly, the workpiece 42 forms a rear wall of the torch device with the exhaust port being perpendicular to the gas stream passing through the nozzle 35.

The combustion chamber 33 provides a volume in which the fuel and oxidizer, when in a form other than gas, can mix and burn. As can be appreciated, without a combustion chamber providing a volume for vaporization of non-gaseous components, one could not successfully operate a torch using non-gaseous components. With hypergolic materials, whether they be liquid, gels, or even gases, they obviously cannot be premixed. In underwater applications particularly, the combustion chamber additionally provides a space for hot gases to be well-developed into a flame prior to exit at a high velocity from the nozzle 35. Further, as indicated, the temperatures of the gases are increased due to the pressure created by the throat constriction. This additionally serves to enable successful underwater cutting and welding.

The size of the orifices 25 and 27 in the face of the injector can be used to control the amount of fuel or oxidizer reaching the combustion chamber as a function of pressure. The configuration of the orifices in the injector face affect the combustion efficiency. Thus, the number of streams of oxidizer and fuel and the angles at which they impinge within the combustion chamber can be varied to affect the efficiency. As an example, instead of one fuel and one oxidizer stream, as shown in the figures, it might be preferable in certain instances to use two streams of oxidizer impinging on one stream of fuel, while with another fuel and oxidizer system, the opposite could be achieved using two fuel streams impinging on one oxidizer stream. A preferred construction could comprise one fuel and one oxidizer stream to create the flame with a second oxidizer stream which furnishes an excess of oxidizer to achieve the desired cutting. A wealth of knowledge has been gained in the rocket propulsion field with regard to orifice design and injector heads for given fuels and oxidizers. This knowledge and theory can be readily applied to the concept of the torch disclosed.

Figure 3:
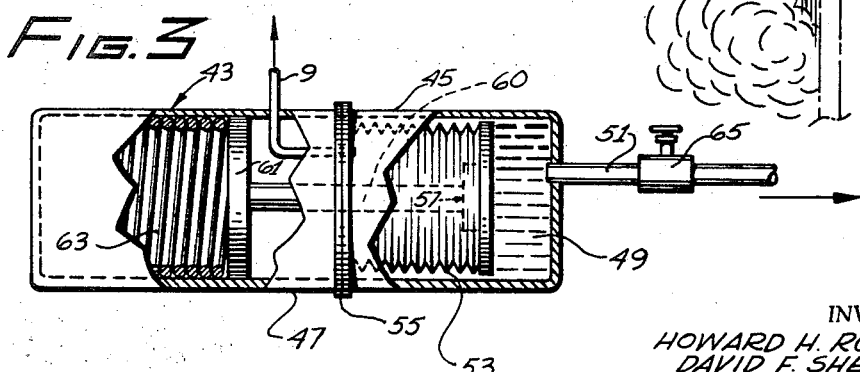
FIG. 3 is a partially sectioned view of the means for feeding the fuel and oxidizer to the torch of the invention.

FIG. 3 depicts a device for storing the fuel and oxidizer used in the torch where ambient pressures range from 0 to 9000 p.s.i.g. The device is not an integral part of the torch, but does depict an example of a storage means which is light in weight and can be used with the liquids and gels which are suitable for the torch of the invention. Shown is a closed, relatively thin-walled tank 43 divided into two sections, the front portion 45 and a rear portion 47. The front portion 45 contains the material 49 to be delivered through an outlet line 51 to the torch. Additionally, disposed within the front portion 45 is a bellows assembly 53 affixed to a dividing plate 55, which serves to divide the front portion 45 from the rear portion 43 of the device. The opposite end of the bellows is movable and is affixed to a piston assembly 57. A line 59 connects the interior 61 of the bellows assembly with the environment outside of the tank 43. This serves to equalize the pressure within the bellows with that outside thereof. A shaft 60 of piston assembly 57 passes through the dividing wall 55 to a rear slidable piston 61, which is in contact with a spring 63. The device thus provides a small amount of pressure due to the action of the spring on the rear piston 61, which pressure is above ambient, and serves to drive the material 49 through line 51 when a valve 65 is opened. Thus, it can be seen that only a few pounds of pressure will be needed even though the ambient pressure is 9000 p.s.i.g. in order to force the liquid or gel 43 through line 51. As can be appreciated, such a light weight, thin-walled device would not be suitable, and in fact could not be used for gaseous materials in underwater applications because of the inability of a flexible bellows to withstand a large pressure differential. Examples of liquid oxidizers that can be utilized include halogen fluorides such as chlorine trifluoride, bromine pentafluoride and chlorine pentafluoride, nitrogen tetroxide, and the like. Gaseous oxidizers include fluorine, $NF_3$, $N_2F_4$, $ClO_3F$, $O_2$ and the like. Examples of fuels include hydrazine, ammonia, methanol, nitroethane, boranes and silanes, hydrocarbons, and the like. It should be appreciated that virtually any suitable oxidizer-fuel combination can be used successfully. In the operation of the torch in underwater applications, the workpiece is initially heated by the hot gas from the torch. The hot gas for the initial heating of the workpiece can be created at a mixture mole ratio of fuel to oxidizer which is stoichiometric. At an exact stoichimetric mixture this initial heating of the workpiece serves to raise the temperature of the water on the back portion of the piece to its boiling point such that a gaseous region is created on the other side of the piece from the torch. Thus, the water will not act as a coolant at the portion of the workpiece to be cut. At this point in order to achieve a cutting of the workpiece, the mixture ratio of oxidizer to fuel should be raised above stoichiometric. Cutting will then transpire with an excess of oxidizer present. Preferably, the mole ration of oxidizer to fuel should be well above stoichiometry. Extremely successful results are obtained when at least twice the stoichiometric amount of oxidizer is used.

As previously indicated, hypergolic mixtures are quite desirable. Examples of these are $ClF_3$-$N_2H_4$, $ClF_5$-$B_5H_{11}$, $N_2O_4$-$N_2H_4$, and the like. At high pressures that would be encountered in the ocean, it might appear that the necessary vaporization of fuel and oxidizer would not occur. However, when the fuel and oxidizer are hypergolic there is an exothermic reaction which will raise the temperature within the chamber of the device instantaneously above the critical temperature of both the fuel and oxidizer, thus ensuring a vapor phase in which combustion can take place. This transpires even though initially the combustion chamber area is filled with water.

It must be understood that the description of the device disclosed in the figures relates to a basic torch implement for the various applications disclosed. The torch will be used in a variety of tools depending upon the given application. In the underwater environment at extreme depths where manual operation would not be possible, the tool would be part of a remote control device since at many of the pressures involved, man could not endure outside of the protection of pressure enclosures. Thus, the torch as shown will be used in various tool configurations for the manual and remote handling and manipulation thereof. Since these types of devices do not form a part of this invention nor affect the concept involved herein, their description is not warranted.

To illustrate the usefulness of the torch of the invention, several examples under varying conditions were run. The first test was made in air using liquid chlorine trifluoride as the oxidizer with methanol as the fuel. The torch of the invention cut 1/16 inch stainless steel within sixty seconds. Using liquid chlorine trifluoride again as the oxidizer with liquid hydrazine as the fuel, in a mixture ratio of about 10:1, the torch cut under water 3/16 inch 347 stainless steel within eleven seconds. Additionally, using chlorine trifluoride and hydrazine, the torch was stopped and restarted many times under water to demonstrate this ability.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The method of providing a hot flame for cutting and welding comprising:
    directing liquid, slurried or gelled fuel and liquid, slurried or gelled oxidizer to an injector,
    injecting said fuel and oxidizer into a combustion chamber, whereby combustion occurs producing a hot gaseous flame,
    ejecting said hot gaseous products from said combustion chamber toward a surface to be cut or welded.

2. The method of claim 1 wherein said ejecting of said hot gaseous products comprises conducting said hot gaseous products through a nozzle.

3. The method of claim 1 wherein said liquid, slurried or gelled fuel and liquid, slurried or gelled oxidizer are hypergolic.

4. The method of claim 1 further comprising:
    injecting an excess of liquid, slurried or gelled oxidizer over that stoichiometrically required to sustain combustion.

5. A torch for applying hot gases for cutting and welding a workpiece in underwater applications comprising:
    a combustion chamber means for feeding liquid, slurried or gelled fuel and liquid, slurried or gelled oxidizer to said combustion chamber wherein combustion occurs producing hot gases,
    means communicating with said combustion chamber for collimating said gases and exhausting them from said combustion chamber to the end of said device,
    exhaust ports connected to said collimating means for exhausting said gases when the exhaust end of said device is flush against the workpiece.

References Cited

UNITED STATES PATENTS

| 1,991,638 | 2/1935 | Sunderman | 158—27.4 |
| 2,851,094 | 9/1958 | Griffin | 158—28 |
| 3,074,470 | 1/1963 | De Piolenc | 158—28 |
| 2,511,718 | 6/1950 | Kirkham | 158—27.4 |
| 2,976,941 | 2/1961 | Horton | 158—27.4 X |
| 3,173,499 | 3/1965 | Ross | 158—27.4 X |
| 3,234,732 | 2/1966 | Bell | 60—258 |

FOREIGN PATENTS 223,851   4/1925   Great Britain.

FREDERICK L. MATTESON, JR., *Primary Examiner.*

E. G. FAVORS, *Assistant Examiner.*